P. B. SPRAGUE.
LIQUID MEASURING DEVICE.
APPLICATION FILED APR. 4, 1914.
1,204,324.
Patented Nov. 7, 1916.
2 SHEETS—SHEET 2.
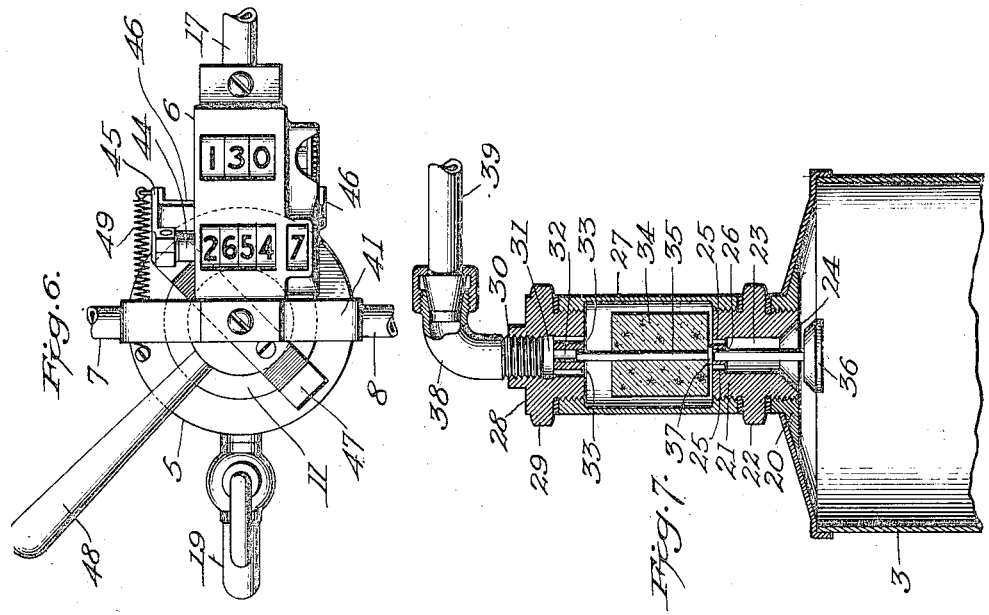
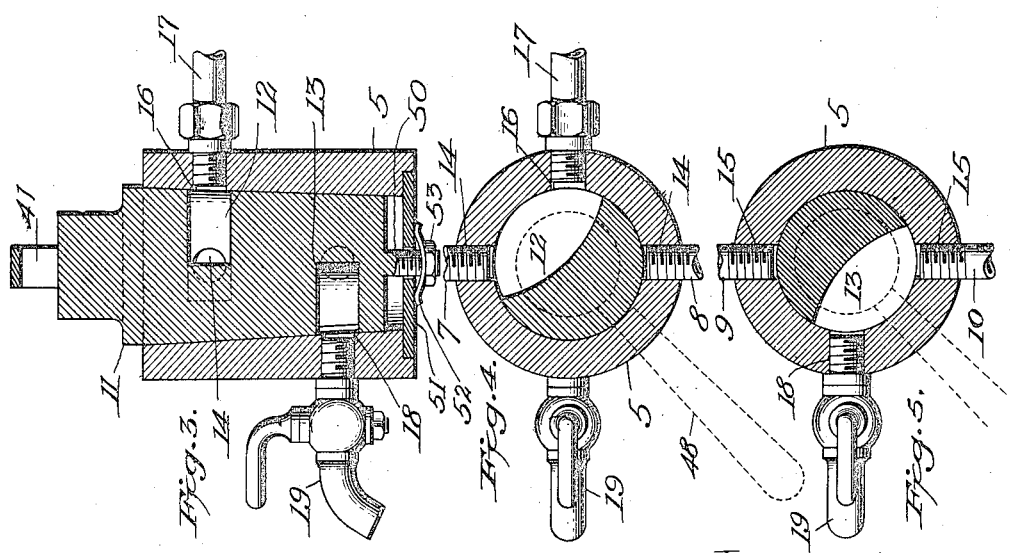
Witnesses:
G. Sargent Elliott
Elizabeth Smith
Inventor:
Parker B. Sprague
By H. S. Bailey. Attorney.

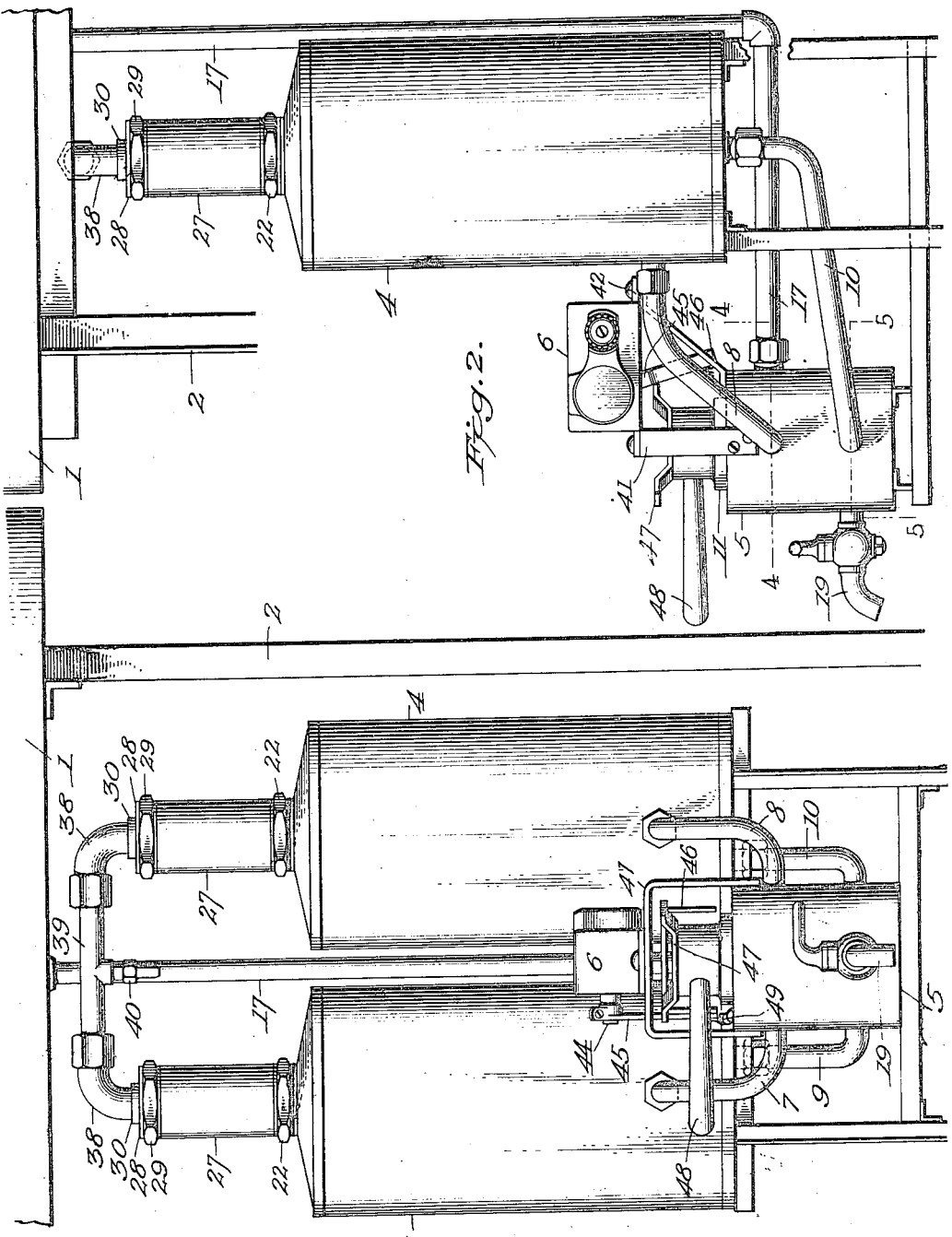

UNITED STATES PATENT OFFICE.

PARKER B. SPRAGUE, OF DENVER, COLORADO.

LIQUID-MEASURING DEVICE.

1,204,324.  Specification of Letters Patent.  Patented Nov. 7, 1916.

Application filed April 4, 1914. Serial No. 829,517.

*To all whom it may concern:*

Be it known that I, PARKER B. SPRAGUE, a citizen of the United States of America, residing in the city and county of Denver and State of Colorado, have invented a new and useful Liquid-Measuring Device, of which the following is a specification.

This invention relates to improvements in liquid measuring and registering devices.

The primary object of the invention is to provide a measuring and registering device more especially adapted for use in the dispensing of coal oil and gasolene, whereby predetermined quantities of such liquids may be drawn from either portable or stationary tanks, such quantities being automatically registered. Further, to provide in connection with a tank, a pair of measuring cans of any desired capacity, and a valve connected by pipes, with said tank and with each of said measuring cans, and also having an outlet faucet, said valve being so arranged that in one position of its movement communication is formed between the tank and one of the measuring cans, while simultaneously therewith, communication between the other tank and the outlet faucet is established, whereby one of said measuring tanks is being filled simultaneously with the emptying of the other can, a registering device being connected with said measuring device which is automatically operated by the action of said valve. These objects are accomplished by the mechanism illustrated in the accompanying drawings, in which:

Figure 1 is a front elevation, showing the improved measuring and registering device arranged in connection with a stationary tank. Fig. 2 is a side elevation of the same. Fig. 3 is a vertical sectional view through the operating valve. Fig. 4 is a horizontal sectional view thereof, on the line 4—4 of Fig. 2. Fig. 5 is a similar horizontal sectional view on the line 5—5 of Fig. 2. Fig. 6 is a plan view of the valve and registering device, showing the manner in which the said registering device is operated by the action of the valve. And Fig. 7 is a vertical sectional view of the upper end of one of the measuring cans and parts connected therewith.

Similar letters of reference refer to similar parts throughout the several views.

The present invention is designed more particularly for use in connection with stationary and portable coal oil and gasolene tanks which are supplied with a given quantity of such liquid, which is delivered to the trade by employees. If such employee is disposed to be dishonest, he may, by giving short measure, appropriate a considerable quantity each day, while his receipts and credit account show that he has sold the full number of gallons intrusted to him. Such dishonesty is not uncommon, and the present invention is designed to prevent the same, for by its use, the consumer is not only insured accurate measure, but a register is automatically made of each given amount drawn from the tank, so that both the consumer and employer are protected against fraud.

Referring to the accompanying drawings: The numeral 1 indicates a portion of a supply tank, a stationary tank being illustrated, and which is supported a suitable distance above the ground or a floor, by suitable supports 2.

The improved measuring device may be placed at any convenient point, but as illustrated, I have shown the same supported immediately below the supply tank. This device comprises a pair of measuring cans 3 and 4, a valve 5, and a register 6, the parts being arranged and connected with each other and with the supply tank, in the following manner: The cans 3 and 4 are of the same capacity and may hold any desired amount. Inlet pipes 7 and 8, respectively, extend from near the upper end of the valve casing and on opposite sides thereof, and connect with the tank at any suitable point above its bottom, and outlet pipes 9 and 10, respectively, extend from the bottoms of the cans and enter the valve casing near its lower end and on opposite sides thereof. Within the valve casing is mounted a tapered plug valve 11, which is provided with ports 12 and 13, which are arranged one above the other and on opposite sides of the valve, the port 12 being on the same plane as the holes 14, in the valve casing into which the inlet pipes 7 and 8 are screwed, while the port 13 is on the same plane as the holes 15 into which the outlet pipes 9 and 10 are screwed. The valve casing is provided on its rear side, midway between the holes 14, and on the same plane, with a hole 16, into which one end of a supply pipe 17 is screwed, the opposite end thereof entering the bottom of the supply tank 1. The valve casing is also provided with a hole 18, on its front side, midway between the holes 15 and on the same plane, into which the threaded end of a faucet 19 is screwed. The ports 12 and 13 are in the form of horizontal recesses, cut in from the periphery of the valve toward its axial center. The port 12, forms communication between either the pipe 7 or 8, and the supply 17, while the port 13, forms communication between either the pipe 9 or 10 and the faucet 19. The cut-off edges of these ports are so spaced that the instant the inlet pipe 7 is completely closed, the opening of the inlet pipe 8 is commenced, the supply pipe being always open; and the instant the outlet pipe 10 is entirely closed the opening of the outlet pipe 9 is commenced. It will thus be seen that with the valve in the position shown in Figs. 4 and 5, oil from the supply pipe 17 passes through the port 12 and pipe 7 to the measuring tank 3, while simultaneously therewith the contents of the can 4 is discharged through the pipe 10, port 13 and faucet 19.

In order that air may escape from the can being filled, and enter the can being emptied, and also that the air outlet or vent of each can may be automatically closed simultaneously with the filling of the can, I arrange and equip each can in the following manner:

In the upper end of each can is secured a disk or plate 20, having a threaded axial aperture, into which is screwed the lower end of a cap 21, having a central wrench receiving portion 22. This cap is provided with an axial recess 23, which at its lower end terminates in a valve seat 24. The end wall of this recess is provided with vent holes 25, and an axial guide hole 26, for the reception of a valve stem, to be presently described. The upper end of the cap is also threaded, and upon this threaded end is screwed a cylindrical housing 27, which is closed at its upper end by a threaded cap 28, having a wrench receiving member 29, which has a circular projection 30, having an internally threaded recess 31, which extends partially down through the cap, the bottom of said recess having an axial guide hole 32, and a plurality of vent holes 33, which extend down through the cap. Within each of the housings 27, is a float 34, of any suitable character, a cork float being shown in the drawings. Each float is secured upon a valve stem 35, which is slidably mounted in the guide holes 26 and 32, of the caps 21 and 28, respectively. Upon the lower end of the valve stem is secured a valve 36, which engages the seat 24 and closes the exit at the top of the can when the same is filled with oil, as will be presently explained. Each float 34 is normally supported a slight distance above the upper end of the cap 21, by a collar 37, on the valve stem, which rests upon the end of the cap, thus permitting free circulation through the vent holes 25. Elbows 38, are screwed into the recesses 31 of the caps 28, and these elbows are connected by a pipe 39.

From the foregoing it will be seen that when the valve is in the position shown in Fig. 4, oil from the supply tank passes through the pipe 17, the valve port 12 and pipe 7, to the measuring can 3, and as this oil is under more or less pressure, the can is quickly filled, the air in the can escaping through the vent holes 25 and 33, and passing through the pipe 39 to the opposite can 4, which is emptying, simultaneously with the filling of the can 3. When the oil rises to the top of the can 3, it passes through the vent holes 25 into the housing 27, and lifts the float 34 by which the valve 36 is moved against the seat 24, and the supply of oil thus cut off, as the can is filled to the limit of its capacity. The valve 36 remains closed, or against its seat 24, until the operating valve 11 is reversed, when the operation above described is repeated in the can 4, and the can 3 is emptied.

The pipe 39, may be provided with any suitable style of air inlet valve 40, as shown in Fig. 1, to insure the entrance of air to the emptying can, in case the filling of the one can should occur before the other is emptied, in which case the air would otherwise be cut off from the emptying can.

I employ in connection with the measuring device, means for registering the amounts drawn from the tank, the same being a registering mechanism of any of the styles in common use, which is operated by the action of the operating valve 11, in the following manner: Upon the upper end of the casing of the operating valve 11, are secured brackets 41 and 42, to which is secured a registering machine 6, of any preferred style, the actuating shaft 44 of which projects far enough to receive an operating lever 45, of suitable length. An inverted U-shaped arm 46 is secured on one side to the lever 45, and this arm is adapted to be alternately engaged by the opposite ends of an arm 47, which is secured to the upper end of the plug valve 11. The valve has an operating handle or lever 48, which projects from the same at right angles to the arm 47. The handle 48 passes through an arc of a quarter of a circle, in its valve-operating movement, and when turned in either direction to the limit of its movement, the arm 46 is engaged by one end of the arm 47, thereby rocking the lever 45, on the actuating shaft of the registering machine, whereby the disks of the register are operated and a record made of each amount of oil withdrawn from the tank, represented by the capacity of the measuring can. As the valve is reversed, the register actuating lever 45 is restored to its normal position by a contraction spring 49, one end of which is secured to the valve casing, and the other end thereof to the arm 45. By this means the lever 45 is in position to be again rocked by the opposite end of the arm 47, as the valve turns toward the reverse position, so that a record is made at each complete right and left movement of the handle 48, of the number of amounts or quantities drawn from the tank, such amounts being represented by the capacity of the measuring cans.

The lower end of the plug valve 11, is preferably provided with a threaded stem 50, which extends through an aperture in a plate 51, on the lower end of the valve casing. A spring or spring washer 52, is placed over the outer end of the stem and against the plate 51, and a nut 53 is screwed on the stem against the spring. The tension thus exerted will act to take up all wear on the valve and thus maintain a close fit between the valve and its casing.

Having described my invention, what I claim as new and desire to secure by Letters Patent, is:

1. Dispensing apparatus, comprising a supply-tank; a pair of receptacles; a valve-casing and a valve therein having independent ports on opposite sides thereof, but in different horizontal planes; a pipe leading from said supply-tank to and in continuous communication with one of said ports; filling pipes extending from the opposite sides of the valve-casing to said receptacles and adapted to be alternately connected through said port with the supply-pipe; a discharge pipe in continuous communication with the other port; and emptying pipes between the valve and said receptacles, adapted to be alternately connected by the latter port with the said discharge pipe; whereby the material to be dispensed is admitted to one receptacle simultaneously with its discharge from the other receptacle.

2. The combination with measuring cans of a controlling valve, filling pipes and emptying pipes extending from the valve to the cans, a supply pipe entering the valve on the plane of the filling pipes, a discharge pipe entering the valve on the plane of the emptying pipes, said valve having independent ports, one of which alternately connects the filling pipes and the supply pipe, while the other alternately connects the emptying pipes and the discharge pipe, of a pipe connecting said cans at their upper ends, and float valves in connection with said pipe for permitting air to pass from the filling can to the emptying can, and for automatically closing the egress when the can is filled to the limit of its capacity.

In testimony whereof I affix my signature in presence of two witnesses.

PARKER B. SPRAGUE.

Witnesses:
G. SARGENT ELLIOTT,
ELIZABETH SMITH.